US012787124B2

(12) United States Patent
Wang

(10) Patent No.: US 12,787,124 B2
(45) Date of Patent: Nov. 3, 2026

(54) HEATING MECHANISM FOR ATOMIZATION BY HEATING AND ATOMIZATION DEVICE

(71) Applicant: SHENZHEN HUACHENGDA PRECISION INDUSTRY CO. LTD., Shenzhen (CN)

(72) Inventor: Xiaodie Wang, Shenzhen (CN)

(73) Assignee: Shenzhen Huachengda Precision Industry Co. Ltd., Shenzhen (CN)

( * ) Notice: Subject to any disclaimer, the term of this patent is extended or adjusted under 35 U.S.C. 154(b) by 651 days.

(21) Appl. No.: 18/272,346

(22) PCT Filed: Feb. 20, 2021

(86) PCT No.: PCT/CN2021/077057

§ 371 (c)(1),
(2) Date: Jul. 13, 2023

(87) PCT Pub. No.: WO2022/174417

PCT Pub. Date: Aug. 25, 2022

(65) Prior Publication Data

US 2024/0023203 A1 Jan. 18, 2024

(51) Int. Cl.

*H05B 3/18* (2006.01)
*A24F 40/10* (2020.01)
*A24F 40/46* (2020.01)

(52) U.S. Cl.

CPC ............... *H05B 3/18* (2013.01); *A24F 40/10* (2020.01); *A24F 40/46* (2020.01);
(Continued)

(58) Field of Classification Search

CPC ................ H05B 3/18; H05B 2203/007; H05B 2203/016; H05B 2203/021;
(Continued)

(56) References Cited

U.S. PATENT DOCUMENTS

2020/0260532 A1* 8/2020 Sajic ...................... H05B 3/342
2021/0000179 A1* 1/2021 Li ........................... A24F 40/44

FOREIGN PATENT DOCUMENTS

CN 109222245 A 1/2019
CN 209732599 U 12/2019
(Continued)

OTHER PUBLICATIONS

International Search Report of PCT Patent Application No. PCT/CN2021/077057 issued on Sep. 28, 2021.
(Continued)

*Primary Examiner* — Robert G Bachner

(57) ABSTRACT

A heating mechanism for atomization by heating and an atomization device, the heating mechanism comprising heating circuits for evaporating liquid and electrodes for connecting to a power supply unit. All of the heating circuits are connected in parallel between contacts of two electrodes, two adjacent heating circuits are connected by a plurality of connections to form a planar integrated unit, and heat dissipation members extending laterally for dispersing heat from the heating circuits are provided in at least the intermediate of the outer heating circuits. The atomization device comprises a porous ceramic body and the heating mechanism, wherein the heating mechanism is embedded in and planarly attached to the bottom of the porous ceramic body. The heating mechanism has a good support strength and provide uniform heat distribution, the heating mechanism of the atomization device is not separated from the ceramic body and has a good heating uniformity.

18 Claims, 4 Drawing Sheets

(52) U.S. Cl.
CPC .. *H05B 2203/007* (2013.01); *H05B 2203/016* (2013.01); *H05B 2203/021* (2013.01); *H05B 2203/037* (2013.01)

(58) Field of Classification Search
CPC ...... H05B 2203/037; H05B 3/24; H05B 3/42; H05B 2203/002; H05B 2203/003; H05B 2203/022; A24F 40/10; A24F 40/46
See application file for complete search history.

(56) References Cited

FOREIGN PATENT DOCUMENTS

| | | | |
|---|---|---|---|
| CN | 111317174 | A | 6/2020 |
| CN | 111728277 | A | 10/2020 |
| CN | 111772242 | A | 10/2020 |
| CN | 112275521 | A | 1/2021 |

OTHER PUBLICATIONS

Extended European Search Report of counterpart European Patent Application No. 21926135.1 issued on Jan. 3, 2024.

* cited by examiner

HEATING MECHANISM FOR ATOMIZATION BY HEATING AND ATOMIZATION DEVICE

FIELD

The present invention relates to the technical field of atomization, and more specifically, to a heating mechanism for atomization by heating and an atomization device.

BACKGROUND

At present, in a heating atomization device, the heating atomization device with a porous ceramic is well received by the market due to its stable structure, good atomization effect, and simple and convenient assembly. Generally, a sheet-shaped heating sheet is embedded on a surface of a porous ceramic body, the liquid is conducted by the porous ceramic body, and the heating sheet generates heat to vaporize and atomize the liquid. Currently, there are two types of assembly structures in the industry. The first type is to print a metal slurry on the surface of the porous ceramic body. The second type is to put a sheet-shaped metal heating element into a ceramic mold, inject a ceramic slurry into the mold, and sinter the heating element and the porous ceramic together, so that the metal heating element can be embedded on the surface of the ceramic. As shown in FIG. 1, in the second type of the assembly structure, generally, a single heating circuit is adopted to form a heating circuit embedded in the bottom of the porous ceramic by detouring into a square wave shape. In the actual use process, due to the requirement for the resistance of the heating element, the heating element is selected to have a thin thickness (generally between 0.1 mm and 0.15 mm). Such a thin single circuit will be uneven due to insufficient supporting force, resulting in detachment from or complete burying in the ceramic body during the embedding process. Due to the varying depth of the single circuit embedded in the porous ceramic body, the consistency during the use is poor. In addition, the single circuit is made of metal which is fast in heat conduction, due to the heat conduction effect, the heat in the middle of the heating circuit is relatively high, and the heat difference between the middle area and both ends is relatively large, which affects the effect of atomization. Besides, the single circuit has a relatively high requirement on the output of the battery, with relatively dispersed heat distribution and a small the power tolerance range. The above problems have a great impact on the consistency of the atomization device in the actual use process.

SUMMARY

Technical Problems

A technical problem to be solved by the present invention is, in view of the aforementioned defects in the prior art, to provide a heating mechanism for atomization by heating with a better support strength and a uniform heat distribution.

A further technical problem to be solved by the present invention is to provide an atomization device that is not separated from a ceramic body, has a better support strength of the heating mechanism, and has a uniform heat distribution.

Solutions of Problems

Technical Solutions

A technical solution adopted by the present invention to solve the technical problem is:

A heating mechanism for atomization by heating, including heating circuits configured for evaporating liquid and two electrodes configured for connecting to a power supply unit, wherein all of the heating circuits are connected in parallel between contacts of the two electrodes, two adjacent heating circuits are connected by a plurality of connections to form a planar integrated unit, and heat dissipation members extending laterally for dispersing heat from the heating circuits are provided in at least the intermediate of the heating circuits located on the outer sides.

Further, in the heating mechanism for atomization, preferably, each of the heating circuits is at least one of a linear unit or a curvilinear unit, or a structure formed by a combination of the linear units and the curvilinear units connected end to end or cross connected.

Further, in the heating mechanism for atomization, preferably, all of the connections are evenly distributed on the heating circuits or arranged symmetrically about the middle of the heating circuits.

Further, in the heating mechanism for atomization, preferably, each of the connections is rod shaped, strip shaped or plate shaped, and its shape is a straight line, a curve or a combination of at least one of the straight line and the curve.

Further, in the heating mechanism for atomization, preferably, all of the heat dissipation members are evenly distributed on the heating circuits or arranged symmetrically about the middle of the heating circuits.

Further, in the heating mechanism for atomization, preferably, the widths or/and the lengths of the heat dissipation members gradually decrease from the middle to the two ends of each of the heating circuits; or/and the arrangement density of the heat dissipation members on each of the heating circuits gradually decreases from the middle to the two sides.

Further, in the heating mechanism for atomization, preferably, the connections are provided with the heat dissipation members for guiding heat to a ceramic body.

Further, in the heating mechanism for atomization, preferably, each of the heat dissipation members is rod shaped, strip shaped or plate shaped, and its shape is a straight line, a curve or a combination of at least one of the straight line and the curve.

Further, in the heating mechanism for atomization, preferably, the heat dissipation members extend towards the outer side of the heating circuits and the free ends of the heat dissipation members are folded out of a plane where the heating circuits is located to form first folded portions for fixing the heating circuits.

Further, in the heating mechanism for atomization, preferably, the heating circuits are provided with second folded portions that are folded outward from a plane where the heating circuits is located.

An atomization device, including a porous ceramic body and the aforementioned heating mechanism, wherein the heating mechanism is embedded in and planarly attached to a bottom of the porous ceramic body.

Beneficial Effects of the Invention

Beneficial Effects

In the present invention, at least two heating circuits are arranged in a parallel or cross manner, and two adjacent heating circuits are connected by the connections, so that the heating circuits form a net shape, and the supporting strength and flatness of the sheet-shaped heating element are improved. Meanwhile, a plurality of heat dissipation members are arranged on the heating circuits to disperse the heat at the higher heat position of the heating circuits, so that the overall heat of the heating mechanism is relatively balanced. In addition, the connections can also achieve the effects of heat dissipation and heat equalization.

BRIEF DESCRIPTION OF THE DRAWINGS

Description of the Drawings

Figure 1:
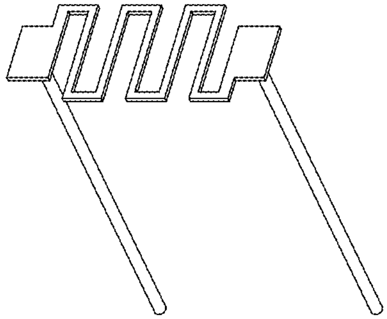
FIG. 1 (Prior Art)
Figure 2:
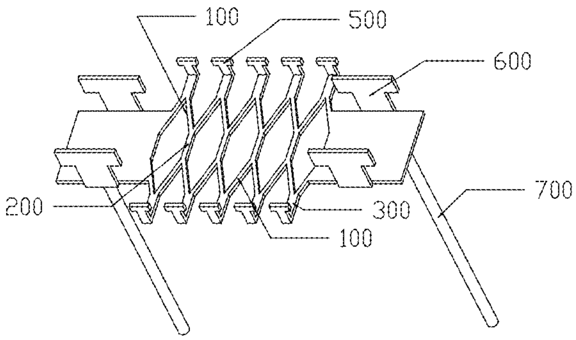
Figure 3:
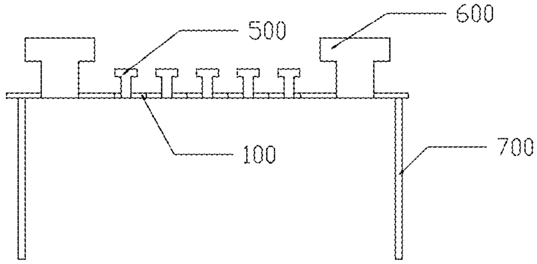
Figure 4:
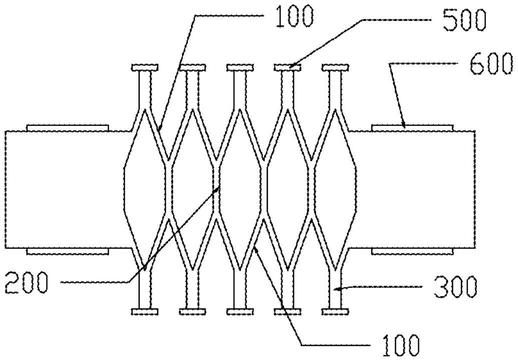
Figure 5:
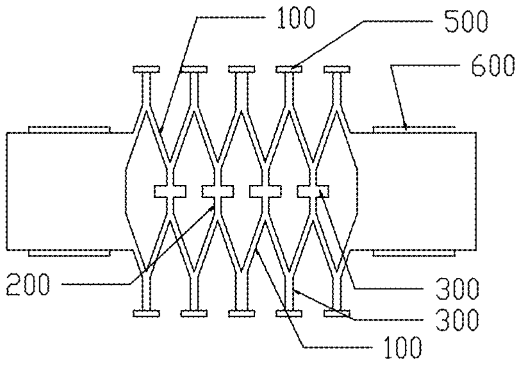
Figure 6:
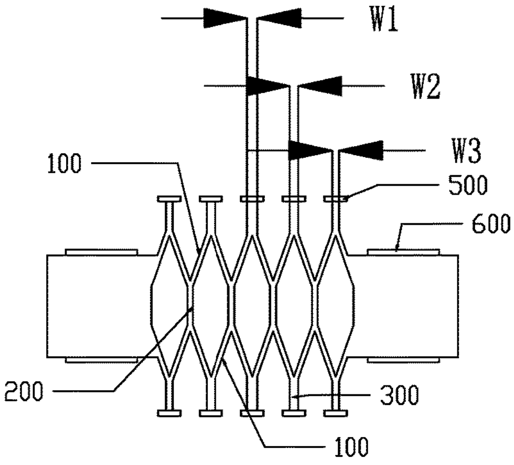
Figure 7:
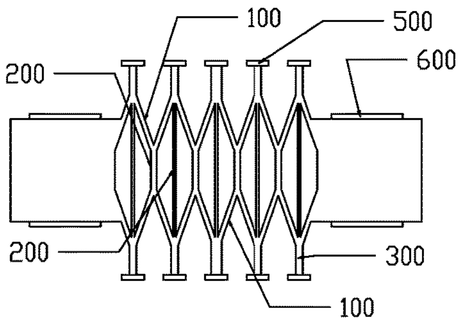
Figure 8:
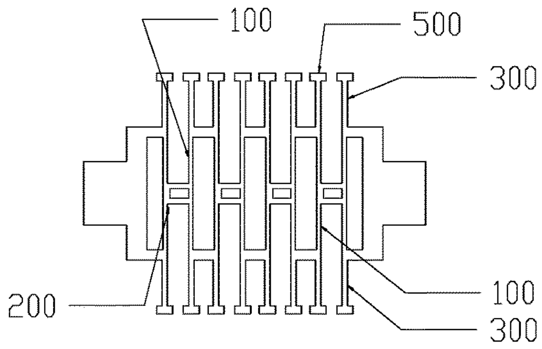
Figure 9:
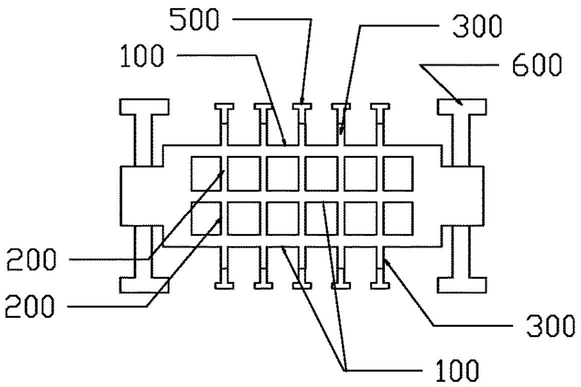
Figure 10:
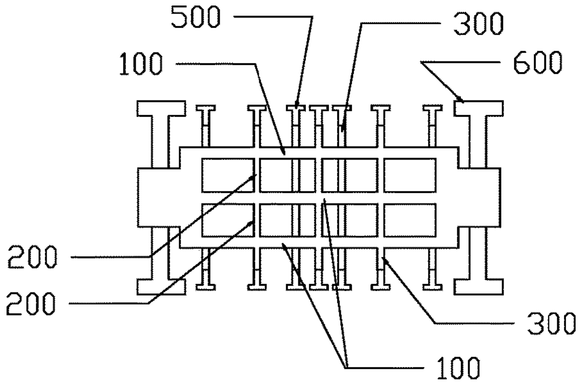
Figure 11:
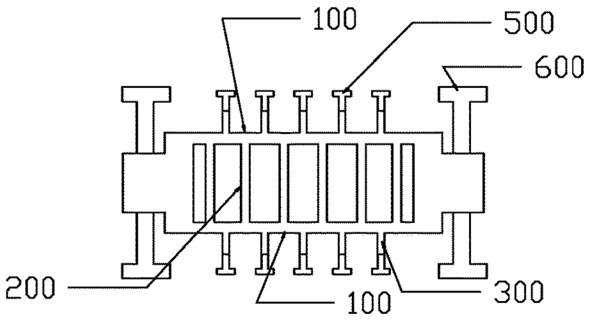
Figure 12:
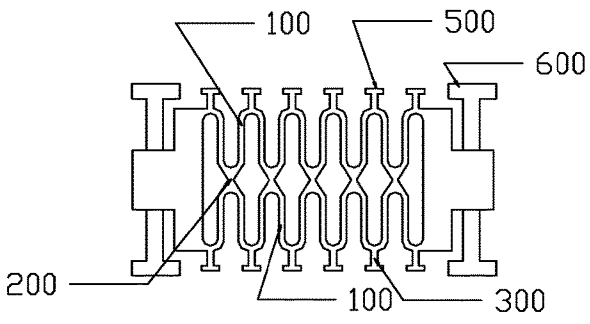
Figure 13:
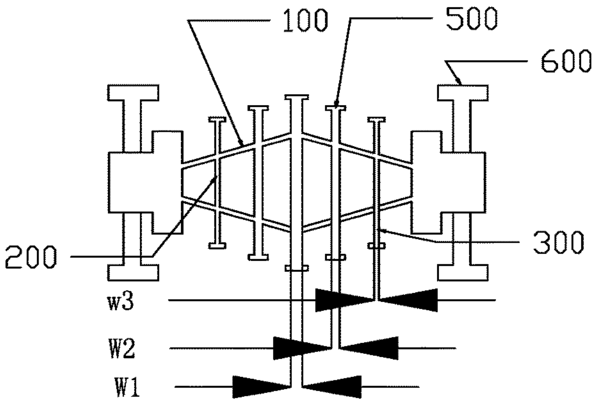
Figure 14:
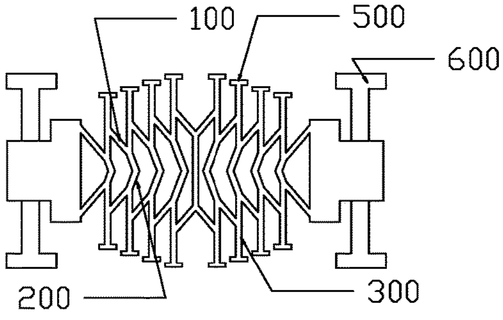
Figure 15:
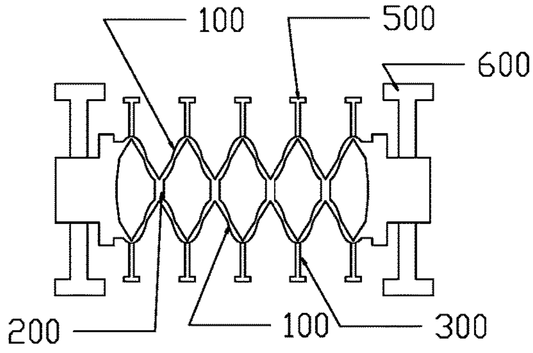
Figure 16:
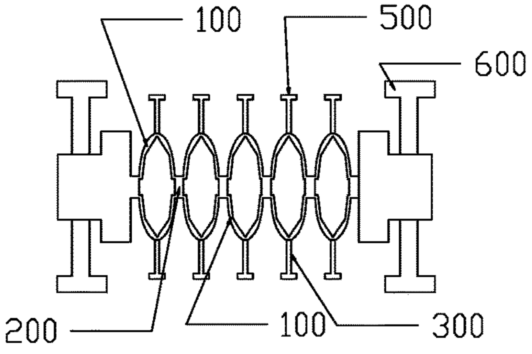
Figure 17:
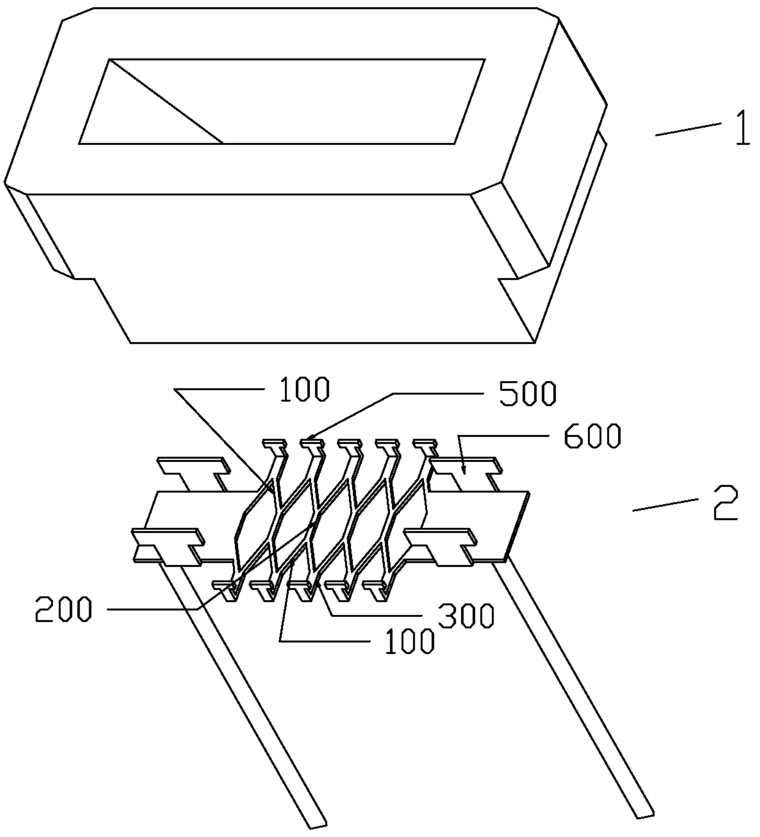

Subject matter of the present invention will be described in even greater detail below based on the exemplary figures. In the accompanying drawings:

FIG. 1 is a schematic structural diagram of the prior art structure;

FIG. 2 is a perspective view of Embodiment 1-1 of the present invention;

FIG. 3 is a side view of the Embodiment 1-1 of the present invention;

FIG. 4 is a top view of the Embodiment 1-1 of the present invention;

FIG. 5 is a top view of Embodiment 1-2 of the present invention;

FIG. 6 is a top view of Embodiment 1-3 of the present invention;

FIG. 7 is a top view of Embodiment 1-4 of the present invention;

FIG. 8 is a top view of Embodiment 1-5 of the present invention;

FIG. 9 is a top view of Embodiment 1-6 of the present invention;

FIG. 10 is a top view of Embodiment 1-7 of the present invention;

FIG. 11 is a top view of Embodiment 1-8 of the present invention;

FIG. 12 is a top view of Embodiment 1-9 of the present invention;

FIG. 13 is a top view of Embodiment 1-10 of the present invention;

FIG. 14 is a top view of Embodiment 1-11 of the present invention;

FIG. 15 is a top view of Embodiment 1-12 of the present invention;

FIG. 16 is a top view of Embodiment 1-13 of the present invention;

FIG. 17 is an exploded view of Embodiment 2 of the present invention; and

Figure 18:
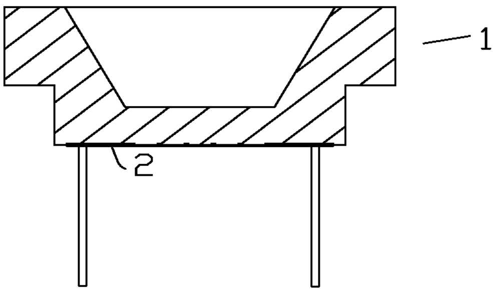

FIG. 18 is a sectional view of the Embodiment 2 of the present invention.

DETAILED DESCRIPTION

Description of the Invention

For better understanding of the technical features, objects and effects of the present invention, the specific embodiments of the present invention will be described in detail with reference to the accompanying drawings.

When one component is described to be "fixed to" or "disposed on" another component, it means that the component may be directly or indirectly located on another component. When one component is described to be "connected to" another component, it means that the component may be directly or indirectly connected to another component.

The orientation or the position relationship indicated by relative terms such as "top", "bottom", "left", "right", "front", "back", "vertical", "horizontal", "top", "bottom", "inner", "outer" and the like are based on the directions or location relationships shown in the accompanying drawings, and are merely used for the convenience of description, and cannot be understood as a limitation on the technical solution. The term "a plurality of" means two or more, unless specifically limited otherwise.

Embodiment 1: As shown in FIG. 12 to FIG. 16, a heating mechanism for atomization by heating, including heating circuits 100 for evaporating liquid and electrodes 700 for connecting a power supply unit, where the number of the heating circuits 100 is at least two, all the heating circuits 100 are connected in parallel between the contacts of the two electrodes 700, and two adjacent heating circuits 100 are connected by a plurality of connections 200 to form a planar integrated unit, and heat dissipation members 300 extending laterally for dispersing heat from the heating circuits 100 are provided in at least the intermediate of the outer heating circuits 100.

Compared with the prior art, the present invention changes the existing single heating circuit 100 into at least two heating circuits 100. Due to the arrangement of the plurality of heating circuits 100, the length of each heating circuit 100 can be shortened, and the heat difference between the intermediate area and both ends of the heating circuit 100 caused by the heat conduction effect can be reduced. By additionally arranging the connections 200 and the heat dissipation members 300, the heat at the higher heat position on the heating circuit 100 is dispersed through the heat dissipation members 300 and the connections 200, so that the overall heat of the heating mechanism is relatively balanced. In addition, the plurality of heating circuits 100 are connected to form an integral plane through the connections 200, the mutual connection makes the plane relatively flat and not prone to tilting, thereby avoiding the situation that part of the heating circuit 100 in the prior art is detached from or completely buried in the ceramic body.

The main structure of the heating mechanism of the present invention is the heating circuits 100. Generally, the heating circuits 100 are a linear extension or a turning structure, and two ends of the heating circuits 100 are connected to electrodes. In order to fully atomize the liquid, the heating circuits 100 need to be arranged in a plane. At least two heating circuits 100 are provided in the present invention, and these heating circuits 100 may be the same or different. For uniform atomization, the entire heating circuits 100 of the heating mechanism are regularly arranged. Generally, according to actual needs, the number of the heating circuits 100 may be 2 to 8, and preferably 2 to 5. The various heating circuits 100 may have a same length or different lengths, and may be in a same shape or different shapes. Preferably, the heating circuits 100 have a same length and are in a same shape. The heating circuits 100 are made of metal.

All the heating circuits 100 are connected between the contacts of the two electrodes 700 at the same time, that is, all the heating circuits 100 are connected in parallel between the contacts of the two electrodes 700. But the heating circuits 100 may be arranged in various ways, in order to be fully arranged into a plane, one way is to arrange side by side, that is, the extension directions of the plurality of heating circuits 100 are the same or substantially the same, and the plurality of heating circuits 100 are arranged at intervals, and the spacing between adjacent heating circuits 100 may be the same or different, preferably the same. The second way is to arrange crossed or staggered, that is, the plurality of heating circuits 100 extend in different directions, so that they are intersected at some position or intersected through the connection 200.

Each of the heating circuits 100 is a structure formed by at least one of a linear unit or a curvilinear unit, or a combination of them through an end-to-end connection or a crossed connection. That is, the heating circuit 100 may be in any shape and is not limited, as long as it meets the requirement of uniform heating in the present invention.

Specifically, the first embodiment of the heating circuit 100 is as follows: the heating circuit 100 is composed of one or more linear units, and one linear unit may be linearly arranged from one electrode contact to another electrode contact; a plurality of linear units are connected end to end to form a linear heating circuit 100 or a looped heating circuit 100.

The second embodiment of the heating circuit 100 is as follows: the heating circuit 100 is composed of one or more curvilinear units, and one curvilinear unit may be arranged from one electrode contact to another electrode contact; a plurality of curvilinear units are connected end to end to form the heating circuit 100.

The third embodiment of the heating circuit 100 is as follows: the heating circuit 100 is formed by connecting one or more linear units and curvilinear units end to end, and the linear units and the curvilinear units may be arranged separately or alternately.

The fourth embodiment of the heating circuit 100 is as follows: the heating circuit 100 is formed by a plurality of linear units in a crossed or staggered connection, where the crossed or staggered connection means that the extension directions of the plurality of linear units are various and changeable and the plurality of linear units are crossed or staggered in a certain extension direction. Wherein, the crossed connection means that the plurality of linear units are directly connected together, and the staggered connection means that the plurality of linear units are connected together through the connection 200 or the heat dissipation member 300.

The fifth embodiment of the heating circuit 100 is as follows: the heating circuit 100 is formed by a plurality of curvilinear units in a crossed or staggered connection. Wherein, the crossed connection means that the plurality of curvilinear units are directly connected together, and the staggered connection means that the plurality of curvilinear units are connected together through the connection 200 or the heat dissipation member 300.

The sixth embodiment of the heating circuit 100 is as follows: the heating circuit 100 is formed by at least one linear unit and at least one curvilinear unit in a crossed or staggered connection. This method is a technical solution formed by combining the fourth and fifth embodiments.

In order to maintain the flatness and supporting performance of the whole heating mechanism, a connection 200 is provided between the adjacent heating circuits 100. The connection 200 may be connected to any position of the heating circuit 100, and may be rod shaped, strip shaped or plate shaped, and the shape of which is a straight line, a curve, or a combination of at least one of them. The rod shape, strip shape or plate shape refers to that, in the transverse width of the connection 200, the structure of the connection 200 may be a rod shape with a relatively narrow width, a strip shape with a certain width, or a plate shape with a relatively wide width, and from the whole or in the length direction, the shape of the connection 200 may be a straight line, a curve or a combination of at least one of them. Herein, the combination of at least one of them means that, the connection 200 may have a plurality of straight line parts connected end to end or cross-connected into a whole; the connection 200 may have a plurality of curve parts connected end to end or cross-connected into a whole; the connection 200 may have a plurality of straight line parts and curve parts connected end to end or cross-connected into a whole, or the connection 200 may also include a combined shape formed by a curve part and a straight line part on different sides. The connections 200 on a single heating circuit 100 may be arranged in parallel or not, which is determined according to actual needs.

In order to maintain the flatness and uniform heat conduction, preferably all the connections 200 are evenly distributed on the heating circuit 100 or symmetrically arranged with respect to the center of the heating circuit 100. The connection 200 may be transversely connected, axially connected or obliquely connected with respect to the heating circuit 100. Adjacent connections 200 may be arranged at intervals, may be adjacently arranged in parallel, or may be arranged crosswise.

The function of the heat dissipation member 300 is to dissipate the heat in the heating circuit 100 from the heat dissipation member 300, and since connections 200 are provided between the heating circuits 100, the heat dissipation members are generally arranged on the outer side of the outermost heating circuit 100, that is, arranged the outer side of all the heating circuits 100. The heat dissipation member 300 extends outward, and the extension direction may be perpendicular to the central axis of the entire heating mechanism, or may be arranged obliquely. The heat dissipation members 300 on a single heating circuit 100 may be parallel or non-parallel, and may be determined according to actual needs.

In terms of the arrangement position, the heat dissipation members 300 provided in the present invention are used to evenly dissipate the heat on the heating circuit 100, especially in the high heat position. That is, the heat dissipation member 300 are arranged at least in the intermediate area of the heating circuit 100, and may also be arranged in the two end areas and the intermediate area of the heating circuit 100. Preferably, all the heat dissipation members 300 are evenly distributed on the heating circuits 100 or symmetrically arranged about the center of the heating circuits 100.

In terms of the structure of the heat dissipation member 300 itself, since the heat in the intermediate area of the heating circuit 100 is higher than the heat in the two end areas of the heating circuit 100, the selected structure of the heat dissipation member 300 is different at different positions. The widths or/and the lengths of the heat dissipation members 300 may be selected to be gradually reduced from the middle of each heating circuit 100 to the two ends of the heating circuit 100, that is, the areas of the heat dissipation members 300 are gradually reduced from the middle of the heating circuit 100 to the two ends of the heating circuit 100. Alternatively, the arrangement density of the heat dissipation members 300 on each heating circuit 100 may be selected to gradually decrease from the middle to the two ends. Alternatively, the shape, size and density of the heat dissipation member 300 are all gradually reduced from the middle to the two ends. This structure and arrangement can dissipate high heat as much as possible, reduce the temperature difference, and maintain the heating uniformity of the heating circuit 100.

The heat dissipation member 300 is rod shaped, strip shaped or plate shaped, and its shape is a straight line, a curve, or a combination of at least one of them. The rod shape, strip shape or plate shape refers to that, in the transverse width of the heat dissipation member 300, the structure of the heat dissipation member 300 may be a rod shape with a relatively narrow width, a strip shape with a certain width, or a plate shape with a relatively wide width, and from the whole or in the length direction, the shape of the heat dissipation member 300 may be a straight line, a curve or a combination of at least one of them. Herein, the combination of at least one of them means that, the heat dissipation member 300 may have a plurality of straight line parts connected end to end or cross-connected into a whole; the heat dissipation member 300 may have a plurality of curve parts connected end to end or cross-connected into a whole; the heat dissipation member 300 may have a plurality of straight line parts and curve parts connected end to end or cross-connected into a whole.

In order to further enhance the heat dissipation efficiency, preferably, the connection 200 is also provided with the heat dissipation member 300 for guiding the heat to the ceramic body. The structure of the heat dissipation member 300 here may be the same as or different from the heat dissipation member 300 in the heating circuit 100. Generally, the length of the connection 200 is relatively short, and the heat dissipation member 300 here is mainly plate shaped or sheet shaped.

Since the heating circuit 100 needs to be embedded in but cannot be buried in the ceramic body, the heating circuit 100 and the ceramic body are prone to being separated. In order to enhance the fixation of the heating circuit 100 and the ceramic body, preferably, the heat dissipation member 300 extends towards the outer side of the heating circuit 100, and the free end of the heat dissipation member 300 is folded out of the plane where the heating circuit 100 is located to form a first folded portion 500 for fixing the heating circuit 100. The first folded portion 500 is located on one side of the plane of the heating circuit 100, and may be buried in the ceramic body during manufacture to strengthen the fixation between the heating circuit 100 and the ceramic body.

In order to further strengthen the supporting force, preferably, the heating circuits 100 are provided with second folded portions 600 that are folded outward from the plane where the heating circuits 100 are located. The second folded portions 600 are preferably disposed at two ends of the heating circuits 100 to maintain the firmness of the fixation between the heating mechanism and the ceramic body from two ends. The second folded portion 600 is also buried in the ceramic body. One or both of the first folded portion 500 and the second folded portion 600 may be provided.

In order to further illustrate the present invention, several specific embodiments are listed below for detailed description.

Embodiment 1-1: As shown in FIG. 2 to FIG. 4, a heating mechanism for atomization by heating, including heating circuits 100 for evaporating the liquid. Two heating circuits 100 are arranged in parallel between the contacts of the two electrode, each heating circuit 100 is formed in a tooth-shaped arrangement or a V-shaped continuous arrangement, and heat dissipation members 300 are provided extending outward from the top ends of the tooth shape. The top end of each tooth is provided with the heat dissipation member 300. Connections 200 are arranged at the bottom ends of the tooth shape to be connected with the top ends of the tooth shape of another heating circuit 100, and the two heating circuits 100 are connected by a plurality of connections 200 to form a planar whole. The connections 200 are parallel to each other, and the heat dissipation members 300 are parallel to each other. The free end of the heat dissipation member 300 is folded out of the plane where the heating circuit 100 is located to form a first folded portion 500, and a second folded portion 600 is formed at the end of the heating circuit 100.

Embodiment 1-2: As shown in FIG. 5, the heating mechanism for atomization by heating in this embodiment is an improvement on the basis of the Embodiment 1-1. The specific improvement is that the heat dissipation members 300 are also provided on the connections 200 to enhance the heat dissipation in the intermediate area of the heating circuits 100, where the heat dissipation member 300 is sheet shaped, and a plurality of heat dissipation members 300 are arranged side by side and are in a same shape. The rest of the structure is the same as that of the Embodiment 1-1, and will not be repeated herein.

Embodiment 1-3: As shown in FIG. 6, the heating mechanism for atomization by heating in this embodiment is an improvement based on the Embodiment 1-1. The specific improvement is the widths of the heat dissipation members 300. The widths of the heat dissipation members 300 decrease from the middle region to the two ends, that is, the heat dissipation members 300 have the widths W1>W2>W3, which enhances the heat dissipation in the middle region of the heating circuits 100. The rest of the structure is the same as the Embodiment 1-1, which will not be repeated herein.

Embodiment 1-4: As shown in FIG. 7, the heating mechanism for atomization by heating in this embodiment is an improvement on the basis of the Embodiment 1-1. The specific improvement is the arrangement of the connections 200. In addition to the connections 200 provided in the Embodiment 1-1, the connections 200 are further provided between the top ends of the tooth shape of one heating circuit 100 and the bottom ends of the tooth shape of the other heating circuit 100, to strengthen the support strength. The rest of the structure is the same as that of the Embodiment 1-1, and will not be repeated herein.

Embodiment 1-5: As shown in FIG. 8, the heating mechanism for atomization by heating in this embodiment is an improvement on the basis of the Embodiment 1-1. The specific improvement is that the shape of the heating circuit 100 is changed to a square wave structure, two heat dissipation members 300 are provided on the top surface of each square wave unit, and two connections 200 are provided on the bottom surface of the square wave unit to be connected to the adjacent heating circuit 100. The connections 200 are arranged in parallel to each other, and similarly, the bottom surface of each square wave unit of the other heating circuit 100 is provided with the heat dissipation members 300 extending outward. The heat dissipation members 300 are arranged in parallel with each other. The rest of the structure is the same as that of the Embodiment 1-1, which is not repeated herein.

Embodiment 1-6: As shown in FIG. 9, the heating mechanism for atomization by heating in this embodiment includes three heating circuits 100, and the three heating circuits 100 are arranged in parallel between the contacts of the two electrode, and the heating circuits 100 are all linear shaped and arranged in parallel with each other. The two heating circuits 100 on the outer sides extend outwards to form the heat dissipation members 300, and the heat dissipation members 300 are perpendicular to the heating circuits 100. Connections 200 are provided between two adjacent heating circuits 100 to connect the two together. In the transverse direction, the connections 200 are on a straight line, and meanwhile, they are on a straight line with the heat dissipation member 300 on the outer side. In other embodiments, in the transverse direction, the connections 200 may be staggered, and the heat dissipation members 300 and the connections 200 may also be staggered. Alternatively, the heat dissipation members 300 and the connections 200 gradually become sparser from the middle to the two sides, since more heat is accumulated in the middle, more heat dissipation members 300 are required.

Embodiment 1-7: As shown in FIG. 10, the heating mechanism for atomization by heating in this embodiment is an improvement on the basis of the Embodiment 1-6. The specific improvement is the arrangement position and density of the heat dissipation members 300 and the connections 200, where the density decreases from the middle area to the two ends, that is, the heat dissipation members 300 are densely arranged in the middle area of the heating circuits 100, and sparsely arranged at the two ends of the heating circuits 100, to enhance the heat dissipation in the middle area of the heating circuits 100. The connections 200 in the middle and the heat dissipation members 300 on the two sides may be distributed in a staggered mode, and the strength of the heating circuits 100 in this embodiment is better than that of a non-staggered one, and deformation is not prone to occurring. The distance that the heat is conducted to the heat dissipation member 300 is short, so that the heat dissipation member 300 can dissipate heat better. The rest of the structure is the same as that in the Embodiment 1-6, and will not be repeated herein.

Embodiment 1-8: As shown in FIG. 11, the heating mechanism for atomization by heating in this embodiment is an improvement on the basis of the Embodiment 1-6. The specific improvement is the number of the heating circuits 100, where two heating circuits 100 are arranged in parallel. The heat dissipation members 300 and the connections 200 are arranged alternately. The rest of the structure is the same as that in the Embodiment 1-6, and will not be repeated herein.

Embodiment 1-9: As shown in FIG. 12, the heating mechanism for atomization by heating in this embodiment includes two heating circuits 100 with circuitous circuits, which are arranged in parallel between the two electrode contacts. Each heating circuit is a waveform circuit formed by connecting curvilinear units end to end or alternately connecting curvilinear units and linear units end to end. A heat dissipation member 300 is connected to the top of the waveform of each curve, and a connection 200 is connected between the top end and the bottom end of the adjacent waveforms, and in this embodiment, the connection 200 is relatively short and forms an integral structure with the adjacent waveform. The circuitous circuit is also an arrangement with good heat balance, so that a heating element with a larger resistance and a longer heating circuit 100 can be produced. A rounded corner design is adopted at the detour point to facilitate machining. In other embodiments, on the basis of this embodiment, the two heating circuits 100 may adopt a mode in which the distance between the middle sections is large and the distance between the two ends is slightly dense, so that the problem of high heat in the middle sections of the two heating circuits 200 can be avoided. In addition, the connections 200 between the two circuits can also play a good role in heat dissipation and heat equalization. The rest of the structure is the same as that of the Embodiment 1-1, and will not be repeated herein.

Embodiment 1-10: As shown in FIG. 13, the heating mechanism for atomization by heating in this embodiment includes two heating circuits 100 arranged side by side between the two electrode contacts, and each heating circuit 100 is formed by connecting two linear units end to end, and the extension directions of the two linear units are different to form a structure arched outwards in the middle. The two heating circuits 100 form a rhombic structure, that is, the distance between the two heating circuits 100 is large in the middle, and small at the two ends. Meanwhile, the width of the heat dissipation member 300 decreases from the middle region to the two ends, that is, the width of the heat dissipation member 300 satisfies W1>W2>W3, to enhance the heat dissipation in the middle region of the heating circuits 100. Furthermore, the changing trends of the connections 200 and the heat dissipation members 300 are the same. In the transverse direction, the heat dissipation members 300 and the connection 200 are on a straight line, and have a same width. The rest of the structure is the same as that in the Embodiment 1-6, and will not be repeated herein.

Embodiment 1-11: As shown in FIG. 14, the heating mechanism for atomization by heating in this embodiment is an improvement on the basis of the Embodiment 1-10. The specific improvement is the shape of the heating circuit 100 and the shape of the connection 200, where the shape of the heating circuit 100 is changed to a sawtooth structure, and the two heating circuits 100 have the same shape. The apex of each sawtooth is connected with a heat dissipation member 300, and the bottom of the sawtooth is provided with a connection 200 to be connected with the adjacent heating circuit 100, and the connections 200 in this embodiment is broken-line shaped formed by connecting straight lines end to end. Compared with the Embodiment 1-10, the connections 200 in this embodiment forming a broken line can be more uniformly arranged in the entire heating mechanism, thereby improving the heating uniformity. The rest of the structure is the same as that of the Embodiment 1-1, and will not be repeated herein.

On the basis of the above-mentioned embodiments, the linear unit may be changed to a folded line composed of linear units or a turning-arc line composed of curvilinear units, etc., so that more detours are achieved, the contact area of the heating circuit and the heating element is larger, and the resistance value of the detour circuit can be larger.

Embodiment 1-12: As shown in FIG. 15, the heating mechanism for atomization by heating in this embodiment is an improvement on the basis of the Embodiment 1-1, and the specific improvement is that the shape of the heating circuit 100 is changed from the sawtooth structure formed by linear units to a waveform unit composed of a special-shaped structure formed by straight lines and curves. Each waveform unit includes straight edges and curved edges alternately arranged. The shape of the heating circuit 100 is designed to be an arc, and the advantages of the arc are: the machining difficulty of the sharp corner is avoided, and the bending positions are relatively smooth, which is convenient for machining. The rest of the structure is the same as that of the Embodiment 1-1, and will not be repeated herein.

Embodiment 1-13: As shown in FIG. 16, the heating mechanism for atomization by heating in this embodiment is an improvement on the basis of the Embodiment 1-12, and the specific improvement is also the shape of the heating circuit 100, which is changed from the sawtooth structure formed by linear units to a waveform unit composed of a special-shaped structure formed by straight lines and curves. Each waveform unit includes straight edges and curved edges, where the curved edges are located outside and the straight edges are located inside, and the bending positions are relatively smooth to facilitate machining. The rest of the structure is the same as that in the Embodiment 1-12, and will not be repeated herein.

Embodiment 2: As shown in FIG. 17 to FIG. 18, an atomization device includes a porous ceramic body 1 and the heating mechanism 2 in the Embodiment 1. The heating mechanism 2 is embedded in and flatly attached to the bottom of the porous ceramic body 1.

The porous ceramic body 1 has a square groove structure, and the heating mechanism 2 is embedded in the bottom of the porous ceramic body 1. The first folded portions 500 and the second folded portions 600 of the heating mechanism 2 are embedded in the porous ceramic body 1 during manufacture, and the least two heating circuits 100 are attached to the bottom of the porous ceramic body 1.

The specific structure of the heating mechanism 1 is the same as that of the Embodiment 1, and will not be repeated herein.

Comparative tests: Using the single circuit in the prior art, the present invention selects three embodiments for testing.

Test method: Different heating mechanisms are selected, where the heating mechanisms are all made of nickel-chromium alloy, and have the resistance value of 1.0±0.05Ω. The power supply is 1.5 V (three stages of heating, and each 0.5 V for 10 seconds), and an infrared thermal imaging thermometer (with an accuracy of ±0.1° C.) is used to observe the temperature differences between the point at the middle of the heating mechanism and the points on two sides of the heating mechanism. The test points are at three positions, where A is at the middle of the ceramic, B and C are at the positions (by capturing the highest temperature value) on the two sides of the ceramic. The temperature values are divided into different intervals, and the temperature difference value is obtained according to the temperatures of the various positions (mainly test the data between 70 degrees Celsius and 350 degrees Celsius).

Comparative Embodiment in the Prior Art

| Number | Temperature at point A (° C.) | Temperature at point B (° C.) | Temperature at point C (° C.) | Maximum temperature difference |
|---|---|---|---|---|
| 1 | 70.5 | 66.1 | 66.5 | 4.4 |
| 2 | 168.5 | 143.1 | 142.1 | 26.4 |
| 3 | 202.4 | 174.3 | 175.8 | 28.1 |
| 4 | 231.2 | 192.9 | 192.5 | 38.7 |
| 5 | 273.9 | 229.3 | 234.2 | 44.6 |
| 6 | 321.8 | 264.3 | 277.7 | 58.4 |

Embodiment 1-1

| Number | Temperature at point A (° C.) | Temperature at point B (° C.) | Temperature at point C (° C.) | Maximum temperature difference |
|---|---|---|---|---|
| 1 | 85.2 | 82.2 | 80.6 | 4.6 |
| 2 | 127.1 | 121.7 | 120.2 | 6.9 |
| 3 | 160.2 | 148.5 | 151.6 | 11.7 |
| 4 | 196.8 | 186.6 | 182.6 | 14.2 |
| 5 | 283.7 | 268.7 | 264.0 | 19.7 |
| 6 | 318.1 | 299.1 | 296.6 | 23.5 |

Embodiment 1-3

| Number | Temperature at point A (° C.) | Temperature at point B (° C.) | Temperature at point C (° C.) | Maximum temperature difference |
|---|---|---|---|---|
| 1 | 73.2 | 75.1 | 73 | 1.9 |
| 2 | 133.3 | 138.7 | 133.2 | 5.4 |
| 3 | 162.2 | 168.3 | 162.6 | 6.1 |
| 4 | 190.5 | 198.8 | 191.1 | 8.3 |
| 5 | 266.7 | 277.5 | 267.5 | 10.8 |
| 6 | 320.1 | 335.1 | 322.6 | 15 |

Embodiment 1-5

| Number | Temperature at point A (° C.) | Temperature at point B (° C.) | Temperature at point C (° C.) | Maximum temperature difference |
|---|---|---|---|---|
| 1 | 80.2 | 85.1 | 80.6 | 4.5 |
| 2 | 141.1 | 151.7 | 141.2 | 10.6 |
| 3 | 152.2 | 162.5 | 151.6 | 16.3 |
| 4 | 180.5 | 196.8 | 182.1 | 16.3 |
| 5 | 253.7 | 273.5 | 254.5 | 19.8 |
| 6 | 310.1 | 335.1 | 314.6 | 25 |

It can be seen from the above data that the temperature difference in the prior art gradually increases as the temperature increases, and the maximum temperature difference is 58.4° C. While in the embodiments of the present invention, by arranging the heat dissipation members and the connections, the temperature of the heating mechanism can be distributed to the porous ceramic, so as to minimize the temperature difference between the middle and the two sides caused by heat conduction and heat radiation; it can be seen that the maximum temperature difference is reduced to 15-25° C. from the data of the above embodiments, which makes the temperature of the heating surface at the bottom of the entire atomization heating mechanism more balanced, and the heat distribution more uniform. The above data show that the structure of the present invention makes the heat distribution more uniform, and the structure of the heating mechanism can well solve the problem of uneven temperature distribution caused by heat radiation, making the temperature difference smaller or even approaching to uniform temperature.

What is claimed is:

1. A heating mechanism for atomization by heating, comprising:

heating circuits configured for evaporating liquid; and two electrodes configured for connecting to a power supply unit, wherein all of the heating circuits are connected in parallel between contacts of the two electrodes, wherein two adjacent heating circuits are connected by a plurality of connections to form a planar integrated unit, and wherein heat dissipation members extending laterally for dispersing heat from the heating circuits are provided in at least the intermediate of the heating circuits located on the outer sides;

wherein the widths or/and the lengths of the heat dissipation members gradually decrease from the middle to the two ends of each of the heating circuits, and/or wherein the arrangement density of the heat dissipation members on each of the heating circuits gradually decreases from the middle to the two sides.

2. The heating mechanism for atomization by heating of claim 1, wherein each of the heating circuits is at least one of a linear unit or a curvilinear unit, or a structure formed by a combination of the linear units and the curvilinear units connected end to end or cross connected.

3. The heating mechanism for atomization by heating of claim 1, wherein all of the connections are evenly distributed on the heating circuits or arranged symmetrically about the middle of the heating circuits.

4. The heating mechanism for atomization by heating of claim 1, wherein each of the connections is rod shaped, strip shaped or plate shaped, and its shape is a straight line, a curve or a combination of at least one of the straight line and the curve.

5. The heating mechanism for atomization by heating of claim 1, wherein all of the heat dissipation members are evenly distributed on the heating circuits or arranged symmetrically about the middle of the heating circuits.

6. The heating mechanism for atomization by heating of claim 1, wherein the connections are provided with the heat dissipation members for guiding heat to a ceramic body.

7. The heating mechanism for atomization by heating of claim 1, wherein each of the heat dissipation members is rod shaped, strip shaped or plate shaped, and its shape is a straight line, a curve or a combination of at least one of the straight line and the curve.

8. The heating mechanism for atomization by heating of claim 1, wherein the heat dissipation members extend towards the outer side of the heating circuits and the free ends of the heat dissipation members are folded out of a plane where the heating circuits is located to form first folded portions for fixing the heating circuits.

9. The heating mechanism for atomization by heating of claim 1, wherein the heating circuits are provided with second folded portions that are folded outward from a plane where the heating circuits is located.

10. An atomization device, comprising:

a porous ceramic body; and the heating mechanism of claim 1, wherein the heating mechanism is embedded in and planarly attached to a bottom of the porous ceramic body.

11. The atomization device of claim 10, wherein each of the heating circuits is at least one of a linear unit or a curvilinear unit, or a structure formed by a combination of the linear units and the curvilinear units connected end to end or cross connected.

12. The atomization device of claim 10, wherein all of the connections are evenly distributed on the heating circuits or arranged symmetrically about the middle of the heating circuits.

13. The atomization device of claim 10, wherein each of the connections is rod shaped, strip shaped or plate shaped, and its shape is a straight line, a curve or a combination of at least one of the straight line and the curve.

14. The atomization device of claim 10, wherein all of the heat dissipation members are evenly distributed on the heating circuits or arranged symmetrically about the middle of the heating circuits.

15. The atomization device of claim 10, wherein the connections are provided with the heat dissipation members for guiding heat to a ceramic body.

16. The atomization device of claim 10, wherein each of the heat dissipation members is rod shaped, strip shaped or plate shaped, and its shape is a straight line, a curve or a combination of at least one of the straight line and the curve.

17. The atomization device of claim 10, wherein the heat dissipation members extend towards the outer side of the heating circuits and the free ends of the heat dissipation members are folded out of a plane where the heating circuits is located to form first folded portions for fixing the heating circuits.

18. The atomization device of claim 10, wherein the heating circuits are provided with second folded portions that are folded outward from a plane where the heating circuits is located.

* * * * *